United States Patent
Carney et al.

(10) Patent No.: US 8,797,562 B2
(45) Date of Patent: Aug. 5, 2014

(54) PAGE LEVEL RECOVERY ON PRINT JOBS FOR PRODUCTION PRINTING SYSTEMS

(75) Inventors: Dennis M. Carney, Louisville, CO (US); Allan A. Hren, Longmont, CO (US); Charles D. Johnson, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1864 days.

(21) Appl. No.: 12/043,098

(22) Filed: Mar. 5, 2008

(65) Prior Publication Data

US 2009/0225350 A1    Sep. 10, 2009

(51) Int. Cl.
*G06K 15/00* (2006.01)
*G06F 3/12* (2006.01)
*G06K 15/02* (2006.01)

(52) U.S. Cl.
CPC .............. *G06K 15/02* (2013.01); *G06F 3/1261* (2013.01); *G06F 3/1204* (2013.01); *G06F 3/1267* (2013.01); *G06F 3/1207* (2013.01)
USPC .......... 358/1.14; 358/1.2; 358/1.15; 358/1.16

(58) Field of Classification Search
USPC ................................................. 358/1.1–1.16
See application file for complete search history.

(56) References Cited

U.S. PATENT DOCUMENTS

| | | | |
|---|---|---|---|
| 5,179,410 A * | 1/1993 | Farrell et al. | 399/9 |
| 5,267,727 A * | 12/1993 | DeHority | 270/1.02 |
| 5,859,711 A * | 1/1999 | Barry et al. | 358/296 |
| 6,433,884 B1 | 8/2002 | Kawakami | |
| 6,453,208 B2 * | 9/2002 | Miyasaka et al. | 700/79 |
| 6,857,796 B2 | 2/2005 | Hatayama | |
| 6,924,826 B1 | 8/2005 | Nakagiri et al. | |
| 2003/0164971 A1 | 9/2003 | Kidani et al. | |
| 2005/0111028 A1 * | 5/2005 | Kim | 358/1.14 |
| 2005/0146732 A1 | 7/2005 | Kizaki et al. | |
| 2006/0082810 A1 | 4/2006 | Onishi | |
| 2006/0238803 A1 | 10/2006 | Kuroshima | |
| 2006/0238811 A1 | 10/2006 | Soma et al. | |
| 2006/0250645 A1 | 11/2006 | Miyazaki | |
| 2009/0040547 A1 * | 2/2009 | Ferlitsch | 358/1.15 |

FOREIGN PATENT DOCUMENTS

JP    2006123428    5/2006

* cited by examiner

*Primary Examiner* — Benny Q Tieu
*Assistant Examiner* — Michael Y Tzeng
(74) *Attorney, Agent, or Firm* — Duft Bornsen & Fettig LLP

(57) ABSTRACT

A print controller and associated methods of performing recovery processes responsive to a redrive event (i.e., print setting changes/hardware errors) are disclosed. A print controller in one embodiment comprises a job storage system that receives and stores print jobs from host systems, and a print data path from the job storage system to one or more print engines. The print data path includes components operable to process print jobs for imaging on the print engine. The print controller further comprises a redrive system that detects a redrive event, and identifies the print job interrupted by the redrive event. The redrive system also identifies a target page of the identified print job from which to restart the print job, and purges the identified print job from the print data path (along with other print jobs). The redrive system then reschedules the identified print job for processing followed by other eligible jobs.

27 Claims, 7 Drawing Sheets

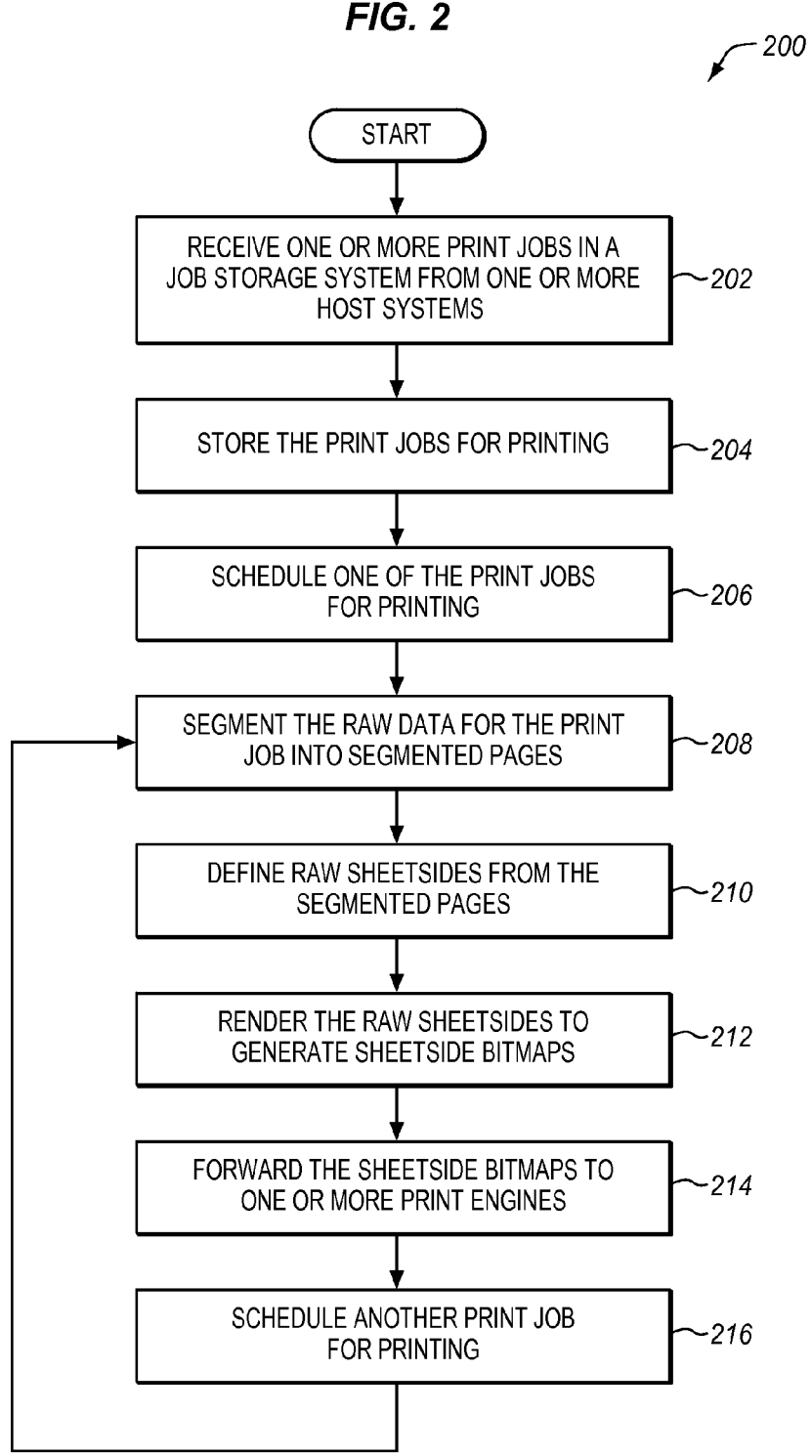

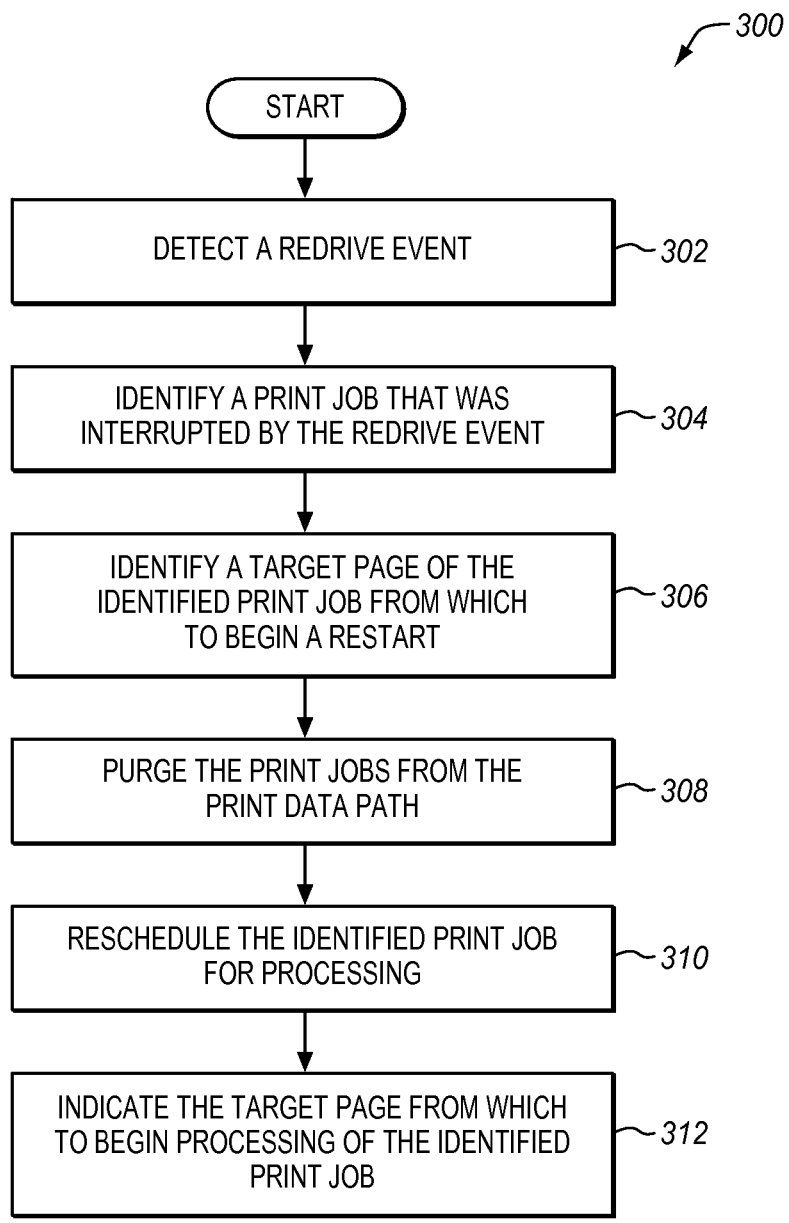

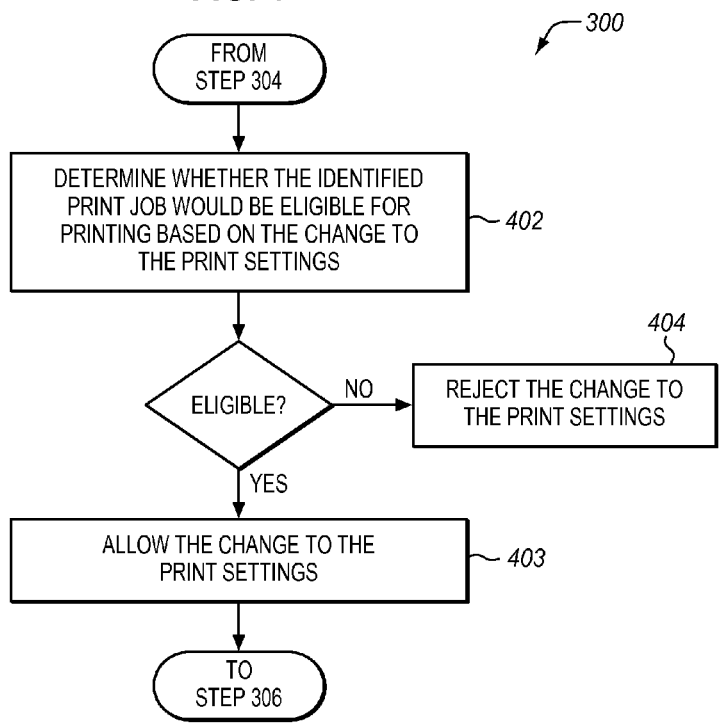
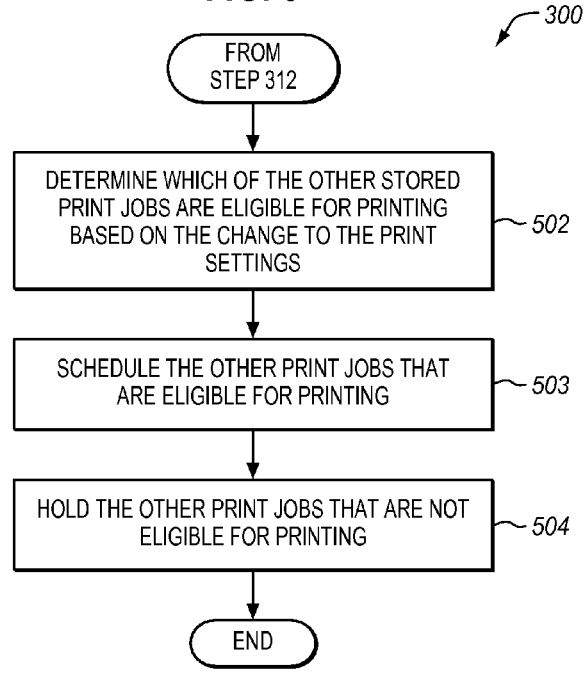

PAGE LEVEL RECOVERY ON PRINT JOBS FOR PRODUCTION PRINTING SYSTEMS

BACKGROUND OF THE INVENTION

1. Field of the Invention

The invention relates to the field of production printing systems and, in particular, to print controllers operable to recover from an event during a printing process of a print job, such as a change to printer settings or a hardware error, by purging the print job from a print data path in the print controller, and restarting processing of the print job from the correct page of the print job.

2. Statement of the Problem

Production printing systems associated with data processing enterprises generally include a localized print controller within the printing system. The print controller controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on one side of a sheet of paper. Each sheetside bitmap generally comprises a 2-dimensional array of picture elements ("pixels") that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines have internal queues for storing the sheetside bitmaps to be printed. A print engine pulls the sheetside bitmaps off of the queue, and performs an imaging process to mark the printable medium (e.g., a sheet of paper) with the sheetside bitmaps provided by the print controller. The print engine may comprise a laser print engine, an ink-jet print engine, or another type of imaging system that transfers each sheetside bitmap to corresponding pixels on paper.

There may be instances during the printing process where print settings are changed after some of the sheetside bitmaps have been created and queued up for printing. These changes to the print settings may affect the sheetside bitmaps making them unusable. For example, the changes to the print settings may include a change to width or length of a form, a change to special marks, a change to the sequence or placement of pages on a sheetside, a change to color management, etc. One problem encountered when there is a change to the print settings is how to perform a recovery process so that the print job may be printed according to the changes to the print settings. Because sheetside bitmaps have been created and queued according to the old print settings, the recovery process needs to deal with these queued bitmaps.

One solution to the problem is to stop the printing process with the bitmaps still queued in the print engine and/or the print controller. When the printing process is restarted, the queued bitmaps are printed with the old print settings. The print controller creates new sheetside bitmaps that incorporate the changed print settings, and these new bitmaps are printed after the old bitmaps have been printed. This solution may be undesirable as the printed pages with the old print settings have to be manually identified and then discarded. It may be difficult to identify which of the printed pages represent the old print settings versus the new print settings. Also, if the change to the print settings is a change in paper size, then the old bitmaps may not fit on the new paper size.

Another solution is to print all queued sheetside bitmaps prior to stopping the printing process. This works well when the internal queues of the print engines are small compared to the speed of the print engine. However, this solution may not be desirable if the internal queues are large, as the print engine may run for several minutes after the change to the print settings in order to empty the internal queues of the old bitmaps.

Another solution is to stop the printing process with sheetside bitmaps still queued in the print engine and/or the print controller. If a printer operator desires the next page printed to have the new print settings, then the printer operator can manually cancel the currently printing instances of the job or jobs, and resubmit them with the starting page adjusted to the next page of the job to be printed. This solution may not be desirable as intervention by the printer operator is required.

Another solution is to use host recovery functionality provided by the print data language, such as IPDS, to purge the internal queues and report back to an external host system with the last page printed. The IPDS host system will then resend the pages, beginning with the next page to print, which will have the new print settings applied when printed. The IPDS solution is not possible in non-IPDS environments as an external host system is not necessarily connected to the print controller at print time, nor are redrive mechanisms available in most other print submission protocols. Furthermore, the IPDS solution covers a data stream from a single IPDS host system. Non-IPDS print jobs may arrive from multiple host systems.

Because present solutions may not be adequate, more effective ways of performing a recovery process may be desired.

SUMMARY OF THE INVENTION

Embodiments of the present invention solve the above and other related problems with an improved recovery process for print jobs. The recovery process described herein is performed in the print controller. The print controller identifies a redrive event, such as a change to print settings or a hardware error, and purges the data for the print jobs in the print controller and the internal queues of the print engines. The print controller then restarts the printing process on the correct page of the print job that was interrupted by the redrive event. Thus, the next sheetside bitmap printed by the print engine includes the correct page of the print job.

One embodiment of the invention comprises a print controller for a production printing system. The print controller comprises a job storage system operable to receive print jobs from at least one host system, and to store the print jobs. The print controller further comprises a print data path from the job storage system to one or more print engines of the production printing system. The print data path includes one or more components operable to process print jobs for imaging on the print engine, where each component includes buffers or work queues used in processing print jobs. For an example, the components in the print data path may include a raw data preprocessing system operable to receive raw data for a print job from the job storage system, to segment the raw data of the print job into segmented pages, and to define raw sheetsides based on the segmented pages. The print data path may further include an interpreter system operable to receive the raw sheetsides from the raw data preprocessing system, and to render the raw sheetsides to generate sheetside bitmaps. The print data path may further include a bitmap processing system operable to receive the sheetside bitmaps from the interpreter system, and to forward the sheetside bitmaps to the print engine for imaging on a printable medium. The print data path may include other components in other embodiments.

The print controller further comprises a redrive system that provides a recovery process responsive to redrive events that occur during printing, such as a change to print settings, a hardware error, etc. To provide the recovery process, the print controller is operable to detect a redrive event during printing of one of the print jobs. The print controller is further operable to identify the print job that was interrupted by the redrive event, and to identify a target page of the identified print job from which to restart the print job. The print controller is further operable to purge the identified print job from the print data path (along with any other print jobs in the print data path), and to reschedule the identified print job for processing in the print data path so that the next page printed by the print engine is the target page of the identified print job.

If the redrive event comprises a change to print settings on the production printing system, then the redrive system may be further operable to determine whether the identified print job would be eligible for printing based on the change to the print settings, to allow the change to the print settings responsive to the identified print job being eligible for printing based on the change to the print settings, and to reject the change to the print settings responsive to the identified print job being ineligible for printing based on the change to the print settings.

If the redrive event comprises a change to print settings on the production printing system, then the redrive system may be further operable to determine which of the other print jobs stored in the job storage system are eligible for printing based on the change to the print settings, to schedule another print job that is eligible for processing, and to hold the other print jobs that are not eligible for printing.

The recovery method described above advantageously allows the print controller to restart the printing process from the page where the printing process left off. Because the print data path is purged responsive to the redrive event, the sheetside bitmaps that are being stored in the print controller and in internal queues in the print engine do not have to be imaged by the print engine and then discarded as with some present recovery methods. The recovery method as described herein also is performed automatically by the print controller so that manual intervention by a printer operator is not needed. Further, the recovery method is performed in the print controller and not in a host system. Thus, a host system providing print jobs to the print controller does not need to be continually connected to the print controller in order to provide recovery functions. Also, multiple host systems may provide print jobs to the print controller, and the print controller will be able to provide recovery processes for the print jobs from the multiple host systems.

The invention may include other exemplary embodiments described below.

DESCRIPTION OF THE DRAWINGS

The same reference number represents the same element or same type of element on all drawings.

FIG. 2 is a flow chart illustrating a method of processing print jobs in a print controller in an exemplary embodiment of the invention.

FIG. 3 is a flow chart illustrating a method of performing a recovery process in a print controller in an exemplary embodiment of the invention.

FIG. 4 is a flow chart illustrating additional steps of the method of FIG. 3 in an exemplary embodiment of the invention.

FIG. 5 is a flow chart illustrating additional steps of the method of FIG. 3 in an exemplary embodiment of the invention.

DETAILED DESCRIPTION

FIGS. 1-8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
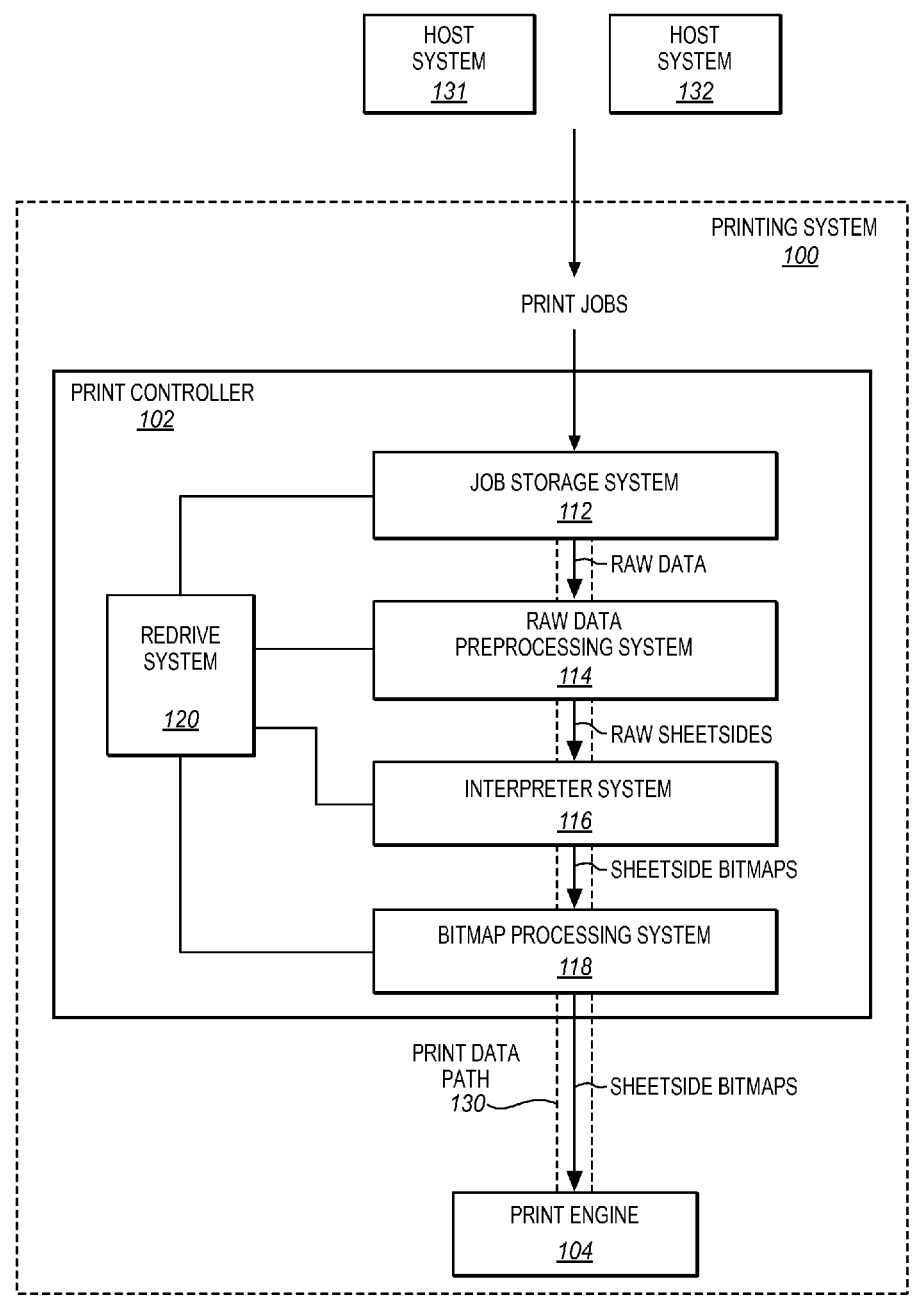
FIG. 1 illustrates a printing system in an exemplary embodiment of the invention.

FIG. 1 illustrates a printing system 100 in an exemplary embodiment of the invention. Printing system 100 comprises any system used to provide marks on a media, such as a continuous forms printer or a cut sheet page printer. In this embodiment, printing system 100 comprises a production printing system, which is a high-speed printer used for volume printing, such as 100 pages per minute or more. Printing system 100 includes a print controller 102 and one or more print engines 104. Print controller 102 comprises any system, server, or components operable to interface one or more host systems with one or more print engines, and to control the printing of print jobs received from the host systems on the print engines. Print controller 102 in this embodiment is a production print controller used for a production printing system. A production print controller is capable of concurrent page or sheetside rendering, meaning that an interpreter system in the print controller is operable to render multiple pages or sheetsides concurrently. Print engine 104 comprises any system operable to provide an imaging process to mark a printable medium. Printing system 100 may include other components or systems not shown for the sake of brevity.

Print controller 102, in its generalized form, includes a job storage system 112, a raw data preprocessing system 114, an interpreter system 116, and a bitmap processing system 118. Job storage system 112 comprises any system, server, or component operable to receive print jobs from one or more host systems 131-132, and store the print jobs for printing on the print engine 104, such as in a raw job spool (not shown). Raw data preprocessing system 114 comprises any system, server, or component operable to receive raw data for print jobs, and perform preprocessing on the raw data before the print jobs are interpreted, such as to segment the print jobs into pages, and assemble the pages into sheetsides. Interpreter system 116 comprises any system, server, or component operable to interpret, render, rasterize, or otherwise convert raw sheetsides for print jobs into sheetside bitmaps for the print jobs. Interpreter system 116 is operable to interpret or render multiple raw sheetsides concurrently so that the rate of rendering substantially matches the rate of imaging of production print engines. Bitmap processing system 118 comprises any system, server, or component operable to store sheetside bitmaps for subsequent printing.

Print controller 102 includes a print data path 130 from job storage system 112 to print engine 104. Print data path 130 includes one or more components (i.e., processes, queues, buffers, etc) that are operable to process print jobs for imaging on print engine 104. For example, print data path 130 includes the components in raw data preprocessing system 114, interpreter system 116, and bitmap processing system 118. Print data path 130 also includes internal queues or memory within print engine 104 that is used to store sheetside bitmaps, even though these internal queues are not in print controller 102. Because these internal queues are controllable by print controller 102 and are in the data path between job storage system 112 and the actual imaging process, these internal queues are considered part of the print data path 130.

Print controller 102 also includes a redrive system 120. Redrive system 120 comprises any system, server, or component operable to detect a redrive event, and initiate a recovery process to restart the printing process. A redrive event as provided herein comprises any event which causes preprocessing work to create output bitmaps or the completed, but not yet printed bitmaps, to no longer be correct for the present print engine configuration. One example of a redrive event comprises a change to one or more print settings being used in the printing process. For example, the changes to the print settings may include a change to width or length of a sheet, a change to special marks, a change to the sequence or placement of pages on a sheetside, a change to color management, etc. Furthermore, a redrive event also comprises an event, such as a hardware error or paper path error (e.g., a paper jam, a paper tear, etc) that requires bitmaps that were previously built, printed, and then discarded to be regenerated.

Print controller 102 as shown in FIG. 1 is comprised of separate components. These separate components may represent hardware used to implement print controller 102. One or more of the separate components may also represent logical blocks implemented in a processor executing instructions.

The following description regarding FIG. 2 discusses processing of print jobs within print controller 102. The description regarding FIG. 3 then discusses a recovery process initiated in print controller 102 responsive to a redrive event.

FIG. 2 is a flow chart illustrating a method 200 of processing print jobs in a print controller in an exemplary embodiment of the invention. The steps of method 200 will be described with reference to print controller 102 in FIG. 1, although method 200 may be performed by other print controllers. The steps of the flow chart in FIG. 2 are not all inclusive and may include other steps not shown.

In step 202, job storage system 112 receives one or more print jobs from host systems 131-132, and/or from other host systems not shown in FIG. 1. The print jobs received are ASCII print data language (PDL) print jobs, such as PostScript (PS) jobs, PDF jobs, PCL jobs, PJL jobs, or PPML jobs.

In step 204, job storage system 112 stores the print jobs for printing. The print jobs stored in job storage system 112 are scheduled for printing, and are output from job storage system 112 in the scheduled order. When a particular print job or multiple jobs are scheduled in step 206, job storage system 112 forwards the raw data for the scheduled print job to raw data preprocessing system 114.

Raw data preprocessing system 114 receives raw data for the print job from job storage system 112. In step 208, raw data preprocessing system 114 segments the raw data into segmented pages for the print job. To segment the pages, raw data preprocessing system 114 may process the raw data of the print job to identify a start-of-page identifier and an end-of-page identifier for a first page of the print job, then identify a start-of-page identifier and an end-of-page identifier for a second page of the print job, etc. In step 210, raw data preprocessing system 114 defines raw sheetsides from the segmented pages. To define the sheetsides, raw data preprocessing system 114 may sequence the segmented pages in the appropriate order for the print job, may assemble the segmented pages onto the appropriate sides (e.g., front side or back side), may lay out multiple segmented pages on a sheetside (e.g., n-up), or perform other layout functionalities to define how the segmented pages are arranged or laid out onto sheetsides. Raw data preprocessing system 114 then forwards the raw sheetsides of the print job to interpreter system 116.

Interpreter system 116 receives the raw sheetsides from raw data preprocessing system 114. In step 212, interpreter system 116 renders the raw sheetsides to generate sheetside bitmaps from the raw sheetsides. The rendering process performed by interpreter system 116 to generate the sheetside bitmaps may alternatively be referred to as ripping, rasterizing, etc. Interpreter system 116 then forwards the sheetside bitmaps to bitmap processing system 118.

Bitmap processing system 118 receives the sheetside bitmaps from interpreter system 116, and stores the sheetside bitmaps. In step 214, bitmap processing system 118 forwards the sheetside bitmaps to print engine 104 (or other print engines not shown in FIG. 1).

Print engine 104 receives the sheetside bitmaps from bitmap processing system 118, and stores the sheetside bitmaps in internal queues. Print engine 104 then performs an imaging process to mark a printable medium (e.g., paper) with the sheetside bitmaps provided by print controller 102.

Depending on the processing capabilities of print controller 102 and the size of the print jobs, another print job may be scheduled in step 216. Job storage system 112 then forwards raw data for the next print job over print data path 130 to raw data preprocessing system 114, and processing continues for the next print job at step 208. Raw data preprocessing system 114 may process the next print job while interpreter system 116 or bitmap processing system 118 are processing the prior print job. Thus, there may be multiple print jobs in print data path 130 that are being simultaneously processed within print controller 102.

At some point during processing of one or more print jobs in print controller 102, a redrive event may be encountered, such as a change to print settings, a paper jam, etc. Responsive to the redrive event, the printing process is stopped. Print controller 102 then performs a recovery process where the next sheet that is printed by print engine 104 represents the point where printing was stopped. For example, in the case of a change to print settings, the sheetside bitmaps being stored and processed by bitmap processing system 118 have the old print settings and are no longer valid. Thus, print controller 102 performs the recovery process so that the next sheetside printed by print engine 104 includes the new print settings. An exemplary recovery process is described below and is illustrated in FIG. 3.

FIG. 3 is a flow chart illustrating a method 300 of performing a recovery process in print controller 102 in an exemplary embodiment of the invention. The steps of method 300 will be described with reference to print controller 102 in FIG. 1, although method 300 may be performed by other print controllers. The steps of the flow chart in FIG. 3 are not all inclusive and may include other steps not shown.

In step 302, redrive system 120 in print controller 102 detects the redrive event. The redrive event occurs during processing of one or more print jobs that are in print data path 130. Because the printing process is stopped due to the redrive event, redrive system 120 identifies the print job, such as by a print job identifier, that was interrupted by the redrive event in step 304. The print job that was interrupted represents the print job that was completely or partially rendered, and was either being imaged by print engine 104 or was about to be imaged. Redrive system 120 also identifies a target page of the identified print job from which to begin the restart of the printing process in step 306. For example, redrive system 120 may identify the last page of the identified print job was imaged by print engine 104 before the printing process was stopped, and then may identify the next page of the identified print job as the target page.

In step 308, redrive system 120 purges the print jobs from the print data path 130. To purge the print jobs, redrive system 120 flushes, clears, erases, or otherwise removes the raw data, the segmented pages, and the sheetside bitmaps from internal memories or queues in the components along print data path 130. For example, redrive system 120 may transmit instructions or messages to raw data preprocessing system 114, interpreter system 116, bitmap processing system 118, and print engine 104 to instruct these components to remove data regarding the print jobs being presently processed from their internal memories and processes.

When print data path 130 is purged, redrive system 120 initiates the restart of the printing process on the print jobs that are stored in job storage system 112. Redrive system 120 thus reschedules the identified print job (the print job that was interrupted) for processing in step 310, such as by instructing job storage system 112 to forward the raw data for the identified print job to raw data preprocessing system 114. The printing process may then restart on the same print job where the printing process was stopped.

Raw data preprocessing system 114 receives the raw data for the print job from job storage system 112. Raw data preprocessing system 114 then segments the raw data into segmented pages for the print job. In step 312, redrive system 120 indicates, to raw data preprocessing system 114, the target page from which to begin processing of the print job. Raw data preprocessing system 114 defines raw sheetsides from the segmented pages so that the first raw sheetside includes the target page. Raw data preprocessing system 114 then forwards the raw sheetsides of the print job to interpreter system 116.

Interpreter system 116 receives the raw sheetsides from raw data preprocessing system 114, and processes the raw sheetsides to generate sheetside bitmaps from the raw sheetsides. Interpreter system 116 then forwards the sheetside bitmaps to bitmap processing system 118. The first sheetside bitmap includes the target page of the print job. Bitmap processing system 118 forwards the sheetside bitmaps to print engine 104 (or other print engines not shown in FIG. 1).

Print engine 104 receives the sheetside bitmaps from bitmap processing system 118, and stores the sheetside bitmaps in internal queues. Print engine 104 then performs an imaging process to mark the printable medium with the sheetside bitmaps provided by print controller 102. Because the first sheetside bitmap includes the target page, the first sheet imaged by print engine 104 comprises the target page of the print job. Thus, the printing process restarts on the next page of the print job that was interrupted by the redrive event.

The recovery method described above advantageously allows print controller 102 to restart the printing process from the page where the printing process left off. Because the print data path 130 is purged responsive to the redrive event, the sheetside bitmaps that are being stored in bitmap processing system 118 and in internal queues in print engine 104 do not have to be imaged by print engine 104 and then discarded as with some present recovery methods. The recovery method as described herein also is performed automatically by print controller 102 so that manual intervention by a printer operator is not needed. Further, the recovery method is performed in the print controller 102, and not in a host system 131-132 as is the case for IPDS printing. Thus, a host system 131-132 providing print jobs to print controller 102 does not need to be continually connected to print controller 102 in order to provide recovery functions. Also, multiple host systems 131-132 may provide print jobs to print controller 102, and print controller 102 will be able to provide recovery processes for the print jobs from multiple host systems 131-132.

If the redrive event comprises a change to print settings, then the recovery method 300 described above may include additional steps. FIGS. 4-5 illustrate further steps of the recovery method 300 when a change to print settings has occurred.

FIG. 4 is a flow chart illustrating additional steps 402-404 of method 300 in an exemplary embodiment of the invention. Responsive to detecting the redrive event (step 302) and identifying the print job that was interrupted by the redrive event (step 304), redrive system 120 determines whether the identified print job would be eligible for printing based on the change to the print settings in step 402. For example, assume that the change to the print settings is a change to the size of paper. If the paper size is too small for the sheetside bitmaps for the identified print job, then the change is not eligible for this print job.

If the identified print job is eligible for printing based on the change to the print settings, then redrive system 120 allows the change to the print settings in step 403. Redrive system 120 then continues with step 306 in FIG. 3. If the identified print job is not eligible for printing based on the change to the print settings, then redrive system 120 rejects the change to the print settings in step 404. Redrive system 120 may then provide some type of indication to the printer operator that the change is not allowed. The printing process may then restart from the point where printing stopped (assuming that printing was stopped due to the attempted change to the print settings).

FIG. 5 is a flow chart illustrating additional steps 502-505 of method 300 in an exemplary embodiment of the invention. After the change to the print settings is made, redrive system 120 determines which of the other print jobs stored in job storage system 112 are eligible for printing based on the change to the print settings. In step 503, redrive system 120 schedules the other print jobs that are eligible for printing, such as by instructing job storage system 112 to forward the raw data for the other print jobs to raw data preprocessing system 114. Processing may then proceed as described in FIG. 2 on the other print jobs. In step 504, redrive system 120 holds the other print jobs that are not eligible for printing. These print jobs will be held until the print settings are again changed such that they become eligible for printing.

Figure 6:
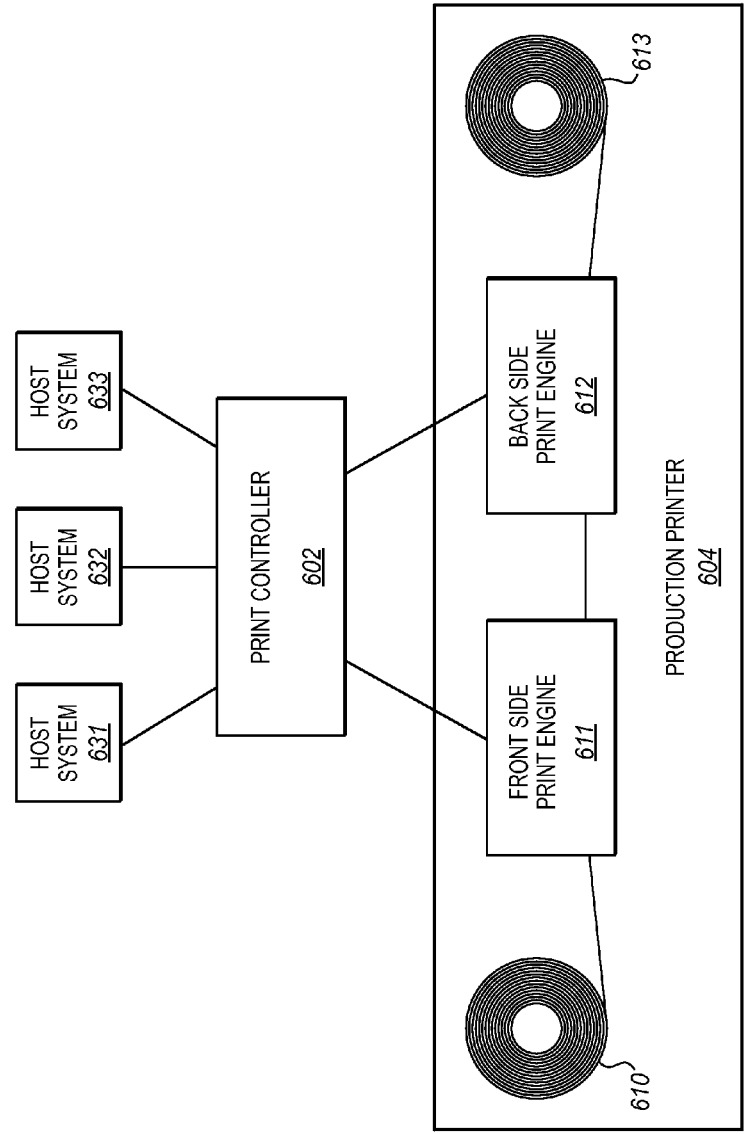
FIG. 6 illustrates a production printing system in an exemplary embodiment of the invention.
Figure 7:
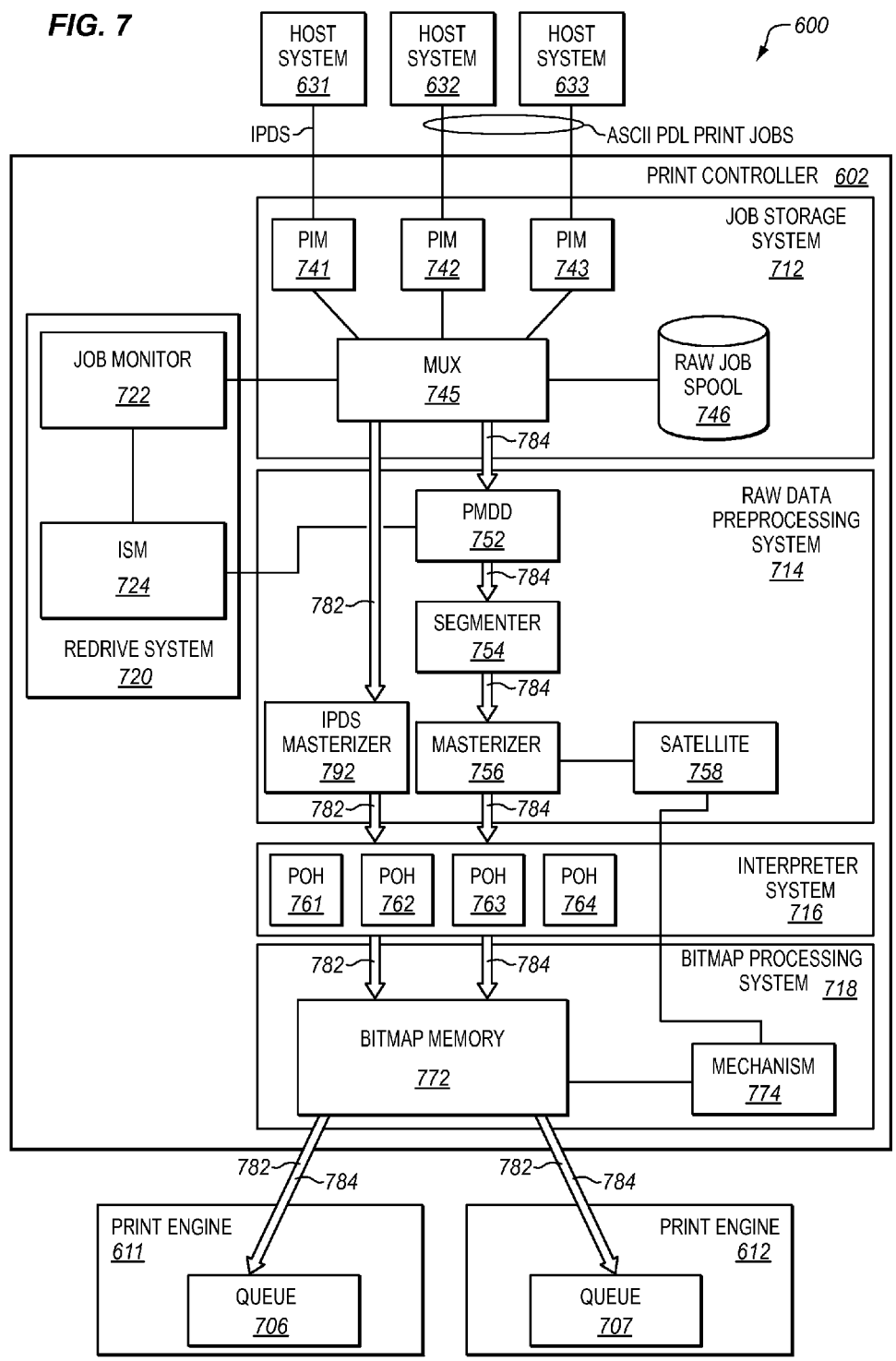
FIG. 7 illustrates a print controller for a production printing system in an exemplary embodiment of the invention.

FIGS. 6-7 and the following description provide a more detailed embodiment of a production printing system 600 and a print controller 602. FIG. 6 illustrates a production printing system 600 in an exemplary embodiment of the invention. Production printing system 600 includes a plurality of host systems 631-633, a print controller 602, and a production printer 604. Production printer 604 in this embodiment comprises a continuous forms printer having an input paper supply 610, a front side print engine 611, a backside print engine 612, and an output paper stack 613. Although a continuous forms printer is illustrated in FIG. 6, the concepts described below also apply to cut sheet production printers.

FIG. 7 illustrates print controller 602 in an exemplary embodiment of the invention. Print controller 602 includes a job storage system 712, a raw data preprocessing system 714, an interpreter system 716, a bitmap processing system 718, and a redrive system 720. Job storage system 712 includes a plurality of Protocol Interface Modules (PIM) 741-743 that are operable to communicate with host systems 631-633. Host systems 631-633 may use different protocols for submitting print jobs to print controller 602, and PIMs 741-743 are operable to receive the different types of print jobs. Assume for this embodiment that one of the host systems, such as host system 631, submits one or more print jobs using IPDS protocol. The other hosts systems 632-633 submit print jobs using ASCII PDLs, such as PS, PDF, PCL, PJL, PPML, etc. Job storage system 712 further includes a multiplexer (MUX) 745 and a raw job spool 746. MUX 745 is operable to determine where to route an IPDS data stream or the ASCII PDL print jobs from PIMs 741-743. For instance, IPDS data steams are not stored in raw job spool 746, so MUX 745 forwards the IPDS data stream from PIM 741 to raw data preprocessing system 714. ASCII PDL print jobs are stored in raw job spool 746, so MUX 745 forwards the print jobs from PIMs 742-743 to raw job spool 746. MUX 745 also retrieves the spooled print jobs according to a schedule controlled by a job monitor 722, and forwards the print jobs to raw data preprocessing system 714.

MUX 745 provides two separate print data paths through print controller 602 to print engines 611-612. Print data path 782 represents the data path for an IPDS data stream through an IPDS masterizer module 792 of print controller 602. Print data path 784 represents the data path for ASCII PDL print jobs through other components of print controller 602. Although print controller 602 is described as handling both IPDS data streams and ASCII PDL print jobs in this embodiment, those skilled in the art will appreciate that print controller 602 may handle only ASCII PDL print jobs in other embodiments.

Raw data preprocessing system 714 includes a Post-MUX Data Delivery (PMDD) module 752, a segmenter module 754, a masterizer module 756, and a satellite module 758. The PMDD module 752 is operable to manage copies for the print job(s), such as if multiple copies are to be printed. Segmenter module 752 is operable to segment a print job into individual pages. Masterizer module 754 is operable to create or define sheetsides of the segmented pages. Masterizer module 754 thus includes layout functionalities to construct the sheetsides based on the segmented pages. Satellite module 758 is operable to sequence sheetside bitmaps that will be generated in interpreter system 716. For instance, some of the sheetsides may take longer to render than others, and thus may be finished out of order. Satellite module 758 is operable to determine the correct order of the sheetside bitmaps that are generated by interpreter system 716.

Interpreter system 716 includes a plurality of Page Object Handler (POH) modules 761-764. POH modules 761-764 are operable to render raw sheetsides to generate sheetside bitmaps. Depending on the format of the print jobs, one of the POHs may be a PostScript (PS) interpreter, one may be a PCL interpreter, etc. One or more of the POH modules 761-764 may be operating in concurrently on the sheetsides in order to increase the processing speed of print controller 602.

Bitmap processing system 718 includes a bitmap memory 772 and a mechanism module 774. Bitmap memory 772 is operable to receive sheetside bitmaps from interpreter system 716, and to store the sheetside bitmaps for printing. Mechanism module 774 is operable to control the transfer of the sheetside bitmaps from bitmap memory 772 to print engines 611-612. Mechanism module 774 receives pointers or other control data from satellite mechanism 758 is order to control the transfer of the sheetside bitmaps.

Print engines 611-612 each include an internal queue 706-707, respectively. Queues 706-707 are operable to receive and buffer sheetside bitmaps received from bitmap memory 772. Print engine 611 will offload the sheetside bitmaps that are buffered in queue 706, and image the sheetside bitmaps on a front side of the paper. Similarly, print engine 612 will offload the sheetside bitmaps that are buffered in queue 707, and image the sheetside bitmaps on the backside of the paper.

Redrive system 720 includes a job monitor 722 and an Internal State Manager (ISM) 724. Job monitor 722 is operable to control the processing of print jobs in print controller 602. Job monitor 722 is also operable to provide a user interface, such as a Graphical User Interface (GUI), to allow a printer operator to view and control the print job processing. ISM 724 is operable to detect redrive events in printing system 600, and to initiate recovery processes responsive to redrive events.

When in operation, PIMs 742-743 receive print jobs from host systems 632-633, respectively. The print jobs received are ASCII PDL print jobs. PIMs 742-743 forward the print jobs to MUX 745, which stores the print jobs on raw job spool 746. Job monitor 722 schedules the print jobs that are stored in raw job spool 746, and instructs MUX 745 to retrieve a first one of the print jobs from the raw job spool 746, and forward the raw data for the first print job to raw data preprocessing system 714 (over print data path 784).

PMDD module 752 receives the raw data for the first print job, and determines whether there are multiple copies requested for the first print job. In this embodiment, there is only one copy requested, so PMDD module 752 may perform other preprocessing on the raw data, and then forward the raw data for the first print job to segmenter module 754.

Segmenter module 754 segments the raw data into segmented pages for the first print job. To segment the pages, segmenter module 754 may process the raw data for the first print job to identify a start-of-page identifier and an end-of-page identifier for a first page, then identify a start-of-page identifier and an end-of-page identifier for a second page, etc. Segmenter module 754 then forwards the segmented pages of the first print job to masterizer module 756.

Masterizer module 756 performs layout functionalities to construct raw sheetsides out of the segmented pages of the first print job. For example, if 2-up printing is requested for the first print job, then masterizer module 756 constructs raw sheetsides with two segmented pages on each sheetside. If two sided printing is requested, then masterizer module 756 constructs the front sheetsides and the back sheetsides based on the segmented pages. Masterizer module 756 then forwards the raw sheetsides to interpreter system 716. Satellite module 758 monitors the sequence or order of the raw sheetsides for the first print job, and generates pointers or other control information indicating the proper sequence.

POHs 761-764, or any subset thereof, receive the raw sheetsides from masterizer module 756, and render the raw sheetsides to generate sheetside bitmaps. POHs 761-764 then forward the sheetside bitmaps to bitmap memory 772, which store the sheetside bitmaps for printing. Mechanism module 774 receives the pointers from satellite module 758, and determines the proper sequence for the sheetside bitmaps. Mechanism module 774 then controls the transfer of the sheetside bitmaps from the bitmap memory 772 to print engines 611-612.

Print engines 611-612 receive the sheetside bitmaps from bitmap memory 772, and store the sheetside bitmaps in queues 706-707, respectively. Each print engine 611-612 then performs an imaging process to mark the paper with the sheetside bitmaps stored in queues 706-707.

Depending on the processing capabilities of print controller 602 and the size of the print jobs, job monitor 722 may schedule a second print job being stored in raw job spool 746 to immediately follow a first print job. If a second print job is scheduled, MUX 745 forwards raw data for the second print job immediately behind the first print job (over print data path 784) to raw data preprocessing system 714. In this way, processing of multiple jobs occurs concurrently through a single print data path 784. Thus, there may be multiple print jobs in print data path 784 that are being simultaneously processed within print controller 602.

At some point during processing of the first print job in print controller 602, assume that a redrive event is encountered, such as a change to print settings. ISM 724 detects the redrive event, and the printing process is stopped. ISM 724 identifies the first print job that was interrupted by the redrive event, such as by a print job identifier for the first print job. ISM 724 determines whether the change to the print settings is eligible for the first print job. For example, assume that the change to the print settings is a change to the size of paper. If the paper size is too small for the sheetside bitmaps for the first print job, then the change is not eligible for the first print job. If the first print job is not eligible for printing based on the change to the print settings, then ISM 724 rejects the change to the print settings. ISM 724 may then provide some type of indication to the printer operator that the change is not allowed. The printing process may then restart from the point where printing stopped.

If the first print job is eligible for printing based on the change to the print settings, then ISM 724 allows the change to the print settings. ISM 724 identifies a target page of the first print job from which to begin the restart of the printing process. For example, ISM 724 may identify the last page of the first print job imaged by print engine 611 or 612 before the printing process was stopped, and then may identify the next page of the first print job as the target page. ISM 724 then reports the redrive event to job monitor 722.

Responsive to the report of the redrive event, job monitor 722 purges the print jobs from print data path 784. To purge the print jobs, job monitor 722 flushes, clears, erases, or otherwise removes the raw data, the segmented pages, the sheetside bitmaps, etc, from internal memories or queues in the components along print data path 784. For example, job monitor 722 may transmit instructions or messages to PMDD 752, segmenter module 754, masterizer module 756, and satellite module 758 to clear any data for the print jobs from their internal memory and processes. Job monitor 722 may also transmit instructions or messages to POHs 761-764 to clear any data for the print jobs from their internal memory and processes. Job monitor 722 may also transmit instructions or messages to bitmap memory 772 to erase any of the presently rendered sheetside bitmaps, and to mechanism module 774 to clear any data for the print jobs from its internal memory and processes. Job monitor 722 may also transmit instructions or messages to print engines 611-612 via mechanism module 774 to clear any sheetside bitmaps from queues 706-707.

After print data path 784 is purged, job monitor 722 initiates the restart of the printing process on the print jobs that are stored in raw job spool 746. Job monitor 722 thus reschedules the first print job for processing, such as by instructing MUX 745 to forward the raw data for the first print job to raw data preprocessing system 714. The printing process may then restart on the first print job where the printing process was stopped.

PMDD module 752 receives the raw data for the first print job again. PMDD module 752 receives an indication from ISM 724 of the target page of the first print job to begin the printing process. PMDD module 752 thus identifies the target page in the raw data of the first print job, and forwards the raw data of the first print job to segmenter module 754 beginning with the target page. Segmenter module 754 segments the raw data into segmented pages for the first print job, where the first page segmented is the target page of the first print job. Segmenter module 754 then forwards the segmented pages of the first print job to masterizer module 756.

Masterizer module 756 constructs raw sheetsides out of the segmented pages of the first print job, and forwards the raw sheetsides to interpreter system 716. POHs 761-764, or any subset thereof, receive the raw sheetsides from masterizer module 756, and render the raw sheetsides to generate sheetside bitmaps. The first sheetside bitmap includes the target page of the first print job. POHs 761-764 then forward the sheetside bitmaps to bitmap memory 772, which stores the sheetside bitmaps. Mechanism module 774 determines the proper sequence for the sheetside bitmaps, and controls the transfer of the sheetside bitmaps from the bitmap memory 772 to print engines 611-612.

Print engines 611-612 receive the sheetside bitmaps from bitmap memory 772, and store the sheetside bitmaps in queues 706-707, respectively. Each print engine 611-612 then performs an imaging process to mark the paper with the sheetside bitmaps stored in queues 706-707. Because the first sheetside bitmap includes the target page of the first print job, the first sheetside that is imaged by print engines 611-612 includes the target page. Thus, printing resumes by printing the next page of the first print job.

The operation of print controller 602 described above is an effective way of recovering from a redrive event. As a comparison, if a redrive event occurs during processing of an IPDS data stream, print controller 602 does not traditionally handle the recovery. For an IPDS data stream, if a redrive event occurs, ISM 724 reports the redrive event to host system 631, which is still connected to print controller 602. Host system 631 will then perform a recovery process according to the IPDS protocol. However, for ASCII PDL print jobs, the host systems 632-633 do not provide such a recovery process. Thus, print controller 602 provides the recovery process as described above.

Figure 8:
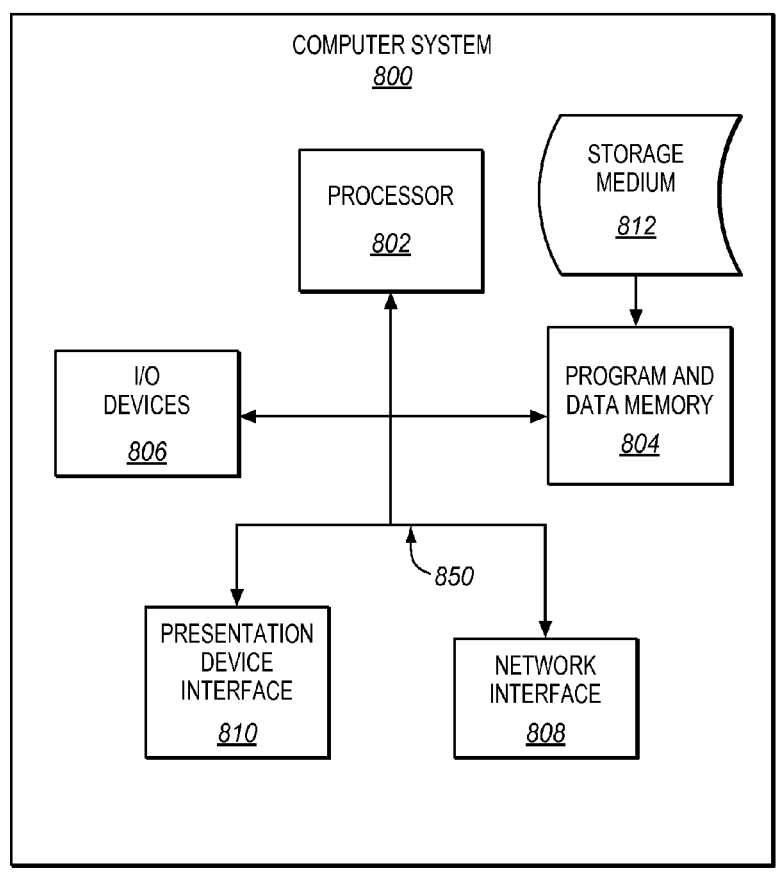
FIG. 8 illustrates a computer system operable to execute computer readable medium embodying programmed instructions to perform desired functions in an exemplary embodiment of the invention.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 is a block diagram depicting a computer system 800 operable to provide features and aspects hereof by executing programmed instructions and accessing data stored on a computer readable storage medium 812.

Furthermore, embodiments of the invention can take the form of a computer program product accessible from a computer-usable or computer-readable medium 812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 800 suitable for storing and/or executing program code will include at least one processor 802 coupled directly or indirectly to memory elements 804 through a system bus 850. The memory elements 804 can include local memory employed during actual execution of the program code, bulk storage, and cache memories which provide temporary storage of at least some program code in order to reduce the number of times code must be retrieved from bulk storage during execution.

Input/output or I/O devices 806 (including but not limited to keyboards, displays, pointing devices, etc) can be coupled to the system either directly or through intervening I/O controllers. Network adapter interfaces 808 may also be coupled to the system to enable the computer system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be coupled to the system to interface to one or more presentation device such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A print controller for a production printing system, the print controller comprising:
 a job storage system operable to receive print jobs from at least one host system, and to store the print jobs;
 a print data path from the job storage system to at least one print engine of the printing system, the print data path includes at least one component operable to process the print jobs to generate sheetside images based on print settings for the printing system for marking by the at least one print engine to a print media; and
 a redrive system operable to detect a redrive event during printing of one of the print jobs, wherein the redrive event comprises a change to print settings for the printing system that alters sheetside images for print jobs, to identify the one print job in the print data path that was interrupted by the redrive event, to identify a target page of the identified print job that is being marked to the print media upon detection of the redrive event, to purge sheetside images for the identified print job from the print data path, and to reschedule the identified print job for processing in the print data path so that the next sheetside image generated for marking includes the target page of the identified print job.

2. The print controller of claim 1 wherein the redrive event comprises a change to the print settings for the at least one print engine.

3. The print controller of claim 2 wherein the redrive system is further operable to:
 determine whether the identified print job would be eligible for printing based on the change to the print settings;
 allow the change to the print settings responsive to the identified print job being eligible for printing based on the change to the print settings; and
 reject the change to the print settings responsive to the identified print job being ineligible for printing based on the change to the print settings.

4. The print controller of claim 2 wherein the redrive system is further operable to:
 determine which of the other print jobs stored in the job storage system are eligible for printing based on the change to the print settings;
 schedule another print job that is eligible for processing; and
 hold the other print jobs that are not eligible for printing.

5. The print controller of claim 1 wherein the change to the print settings for the printing system renders the sheetside images in the print data path obsolete.

6. A method of performing a recovery process in a print controller of a production printing system, wherein the print controller includes a job storage system that receives and stores print jobs from at least one host system, and a print data path from the job storage system to at least one print engine of the printing system, wherein the print data path includes at least one component operable to process the print jobs to generate sheetside images based on print settings for the printing system for marking by the at least one print engine to a print media, the method comprising:
 detecting a redrive event during printing of one of the print jobs, wherein the redrive event comprises a change to print settings for the printing system that alters sheetside images for print jobs;
 identifying the one print job in the print data path that was interrupted by the redrive event;
 identifying a target page of the identified print job that is being marked to the print media upon detection of the redrive event;
 purging sheetside images for the identified print job from the print data path; and
 rescheduling the identified print job for processing in the print data path so that the next sheetside image generated for marking includes the target page of the identified print job.

7. The method of claim 6 wherein the redrive event comprises a change to the print settings for the at least one print engine.

8. The method of claim 7 further comprising:
 determining whether the identified print job would be eligible for printing based on the change to the print settings;
 allowing the change to the print settings responsive to the identified print job being eligible for printing based on the change to the print settings; and
 rejecting the change to the print settings responsive to the identified print job being ineligible for printing based on the change to the print settings.

9. The method of claim 7 further comprising:
determining which of the other print jobs stored in the job storage system are eligible for printing based on the change to the print settings;
scheduling another print job that is eligible for processing; and
holding the other print jobs that are not eligible for printing.

10. The method of claim 6 wherein the change to the print settings for the printing system renders the sheetside images in the print path obsolete.

11. A non-transitory computer readable medium tangibly embodying programmed instructions which, when executed by a computer system, are operable to execute a method of performing a recovery process in a print controller of a production printing system, wherein the print controller includes a job storage system that receives and stores print jobs from at least one host system, and a print data path from the job storage system to at least one print engine of the printing system, wherein the print data path includes at least one component operable to process the print jobs to generate sheetside images based on print settings for the printing system for marking by the at least one print engine to a print media, the method comprising:
detecting a redrive event during printing of one of the print jobs, wherein the redrive event comprises a change to print settings for the printing system that alters sheetside images for print jobs;
identifying the one print job in the print data path that was interrupted by the redrive event;
identifying a target page of the identified print job that is being marked to the print media upon detection of the redrive;
purging sheetside images for the identified print job from the print data path; and
rescheduling the identified print job for processing in the print data path so that the next sheetside image generated for marking includes the target page of the identified print job.

12. The non-transitory computer readable medium of claim 11 wherein the redrive event comprises a change to the print settings for the at least one print engine.

13. The non-transitory computer readable medium of claim 12 wherein the method further comprises:
determining whether the identified print job would be eligible for printing based on the change to the print settings;
allowing the change to the print settings responsive to the identified print job being eligible for printing based on the change to the print settings; and
rejecting the change to the print settings responsive to the identified print job being ineligible for printing based on the change to the print settings.

14. The non-transitory computer readable medium of claim 12 wherein the method further comprises:
determining which of the other print jobs stored in the job storage system are eligible for printing based on the change to the print settings;
scheduling another print job that is eligible for processing; and
holding the other print jobs that are not eligible for printing.

15. The computer non-transitory readable medium of claim 11 wherein the change to the print settings for the printing system renders the sheetside images in the print path obsolete redrive event comprises a hardware error in the production printing system.

16. A print controller for a production printing system, the print controller comprising:
a job storage system operable to receive print jobs from at least one host system, and to store the print jobs;
a print data path from the job storage system to at least one print engine of the printing system, the print data path comprising:
a raw data preprocessing system operable to receive raw data for print jobs from the job storage system, to segment the raw data of the print job into segmented pages, and to define raw sheetsides based on the segmented pages;
an interpreter system operable to receive the raw sheetsides from the raw data preprocessing system, and to render the raw sheetsides to generate sheetside bitmaps; and
a bitmap processing system operable to receive the sheetside bitmaps from the interpreter system, and to forward the sheetside bitmaps to the at least one print engine for marking to a print media; and
a redrive system operable to detect a redrive event during printing of one of the print jobs, wherein the redrive event comprises a change to print settings for the printing system that alters a generation of sheetside images for print jobs, to identify the one print job in the print data path that was interrupted by the redrive event, to identify a target page of the identified print job that is being marked to the print media, to purge sheetside bitmaps for the identified print job from the print data path, and to reschedule the identified print job for processing in the print data path so that the next sheetside bitmap generated for marking includes the target page of the identified print job.

17. The print controller of claim 16 wherein:
the job storage system is further operable to forward raw data for the identified print job to the raw data preprocessing system;
the raw data preprocessing system is further operable to segment the raw data of the identified print job into segmented pages;
the redrive system is further operable to indicate the target page from which to begin processing of the identified print job to the raw data preprocessing system;
the raw data preprocessing system is further operable to define raw sheetsides from the segmented pages so that the first raw sheetside includes the target page, and to forward the raw sheetsides of the identified print job to the interpreter system;
the interpreter system is further operable to receive the raw sheetsides from the raw data preprocessing system, and to render the raw sheetsides to generate sheetside bitmaps;
the bitmap processing system is further operable to receive the sheetside bitmaps from the interpreter system, and to forward the sheetside bitmaps to the at least one print engine so that the next sheetside bitmap that is printed by the at least one print engine is the target page of the identified print job.

18. The print controller of claim 16 wherein the redrive event comprises a change to the print settings for the at least one print engine.

19. The print controller of claim 18 wherein the redrive system is further operable to:
determine whether the identified print job would be eligible for printing based on the change to the print settings;
allow the change to the print settings responsive to the identified print job being eligible for printing based on the change to the print settings; and reject the change to the print settings responsive to the identified print job being ineligible for printing based on the change to the print settings.

20. The print controller of claim 18 wherein the redrive system is further operable to:
determine which of the other print jobs are eligible for printing based on the change to the print settings;
schedule another print job that is eligible for printing; and
hold the other print jobs that are not eligible for printing.

21. The print controller of claim 16 wherein the change to the print settings for the printing system renders the sheetside images in the print data path obsolete.

22. The print controller of claim 16 wherein the production printing system comprises a continuous forms printing system or a cut sheet printing system.

23. The print controller of claim 16 wherein the job storage system comprises:
a raw job spool operable to store print jobs;
a plurality of Protocol Interface Modules (PIM) operable to receive print jobs from the at least one host system; and
a multiplexer (MUX) operable to route the print jobs received in the PIMs to the raw job spool, and to retrieve the print jobs from the raw job spool according to a schedule.

24. The print controller of claim 23 wherein the raw data preprocessing system comprises:
a Post-MUX Data Delivery (PMDD) module operable to receive the raw data for the print job from the job storage system;
a segmenter module operable to segment the raw data of the print job into the segmented pages;
a masterizer module operable to define the sheetsides based on the segmented pages; and
a satellite module operable to sequence the sheetside bitmaps generated in the interpreter system.

25. The print controller of claim 24 wherein the interpreter system comprises:
a plurality of Page Object Handler (POH) modules operable to render the raw sheetsides to generate the sheetside bitmaps.

26. The print controller of claim 25 wherein the bitmap processing system comprises:
a bitmap memory operable to receive the sheetside bitmaps from the interpreter system, and to store the sheetside bitmaps for printing; and
a mechanism module operable to control the transfer of the sheetside bitmaps from the bitmap memory to the at least one print engine.

27. The print controller of claim 26 wherein the redrive system comprises:
a job monitor operable to control the processing of the print jobs in the print controller; and
an Internal State Manager (ISM) operable to detect the redrive event, and to initiate a recovery process responsive to the redrive event.

* * * * *